(12) United States Patent
Paek et al.

(10) Patent No.: US 7,742,591 B2
(45) Date of Patent: Jun. 22, 2010

(54) QUEUE-THEORETIC MODELS FOR IDEAL INTEGRATION OF AUTOMATED CALL ROUTING SYSTEMS WITH HUMAN OPERATORS

(75) Inventors: Timothy Paek, Sammamish, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1477 days.

(21) Appl. No.: 10/827,873

(22) Filed: Apr. 20, 2004

(65) Prior Publication Data
US 2004/0264672 A1 Dec. 30, 2004

Related U.S. Application Data

(63) Continuation-in-part of application No. 10/610,486, filed on Jun. 30, 2003.

(51) Int. Cl.
*H04M 3/00* (2006.01)
(52) U.S. Cl. ............... 379/266.01; 379/265.01; 379/266.08
(58) Field of Classification Search ........... 379/265.01, 379/265.11; 707/3; 714/46
See application file for complete search history.

(56) References Cited

U.S. PATENT DOCUMENTS

| | | | |
|---|---|---|---|
| 4,747,054 A | | 5/1988 | Chittineni |
| 5,291,550 A | * | 3/1994 | Levy et al. .................... 379/242 |
| 5,493,692 A | | 2/1996 | Theimer et al. |
| 5,519,773 A | * | 5/1996 | Dumas et al. .......... 379/265.05 |
| 5,530,744 A | * | 6/1996 | Charalambous et al. ...................... 379/266.08 |
| 5,544,321 A | | 8/1996 | Theimer et al. |
| 5,555,376 A | | 9/1996 | Theimer et al. |
| 5,561,711 A | | 10/1996 | Muller |
| 5,603,054 A | | 2/1997 | Theimer et al. |
| 5,611,050 A | | 3/1997 | Theimer et al. |

(Continued)

FOREIGN PATENT DOCUMENTS

| | | |
|---|---|---|
| EP | 1 176 838 A | 1/2002 |
| WO | 9800787 | 1/1998 |

OTHER PUBLICATIONS

Andy Harter, et al., A Distributed Location System for the Active Office, IEEE Network, 1994, pp. 62-70.

(Continued)

*Primary Examiner*—Rasha S Al Aubaidi
*Assistant Examiner*—Khai N Nguyen
(74) *Attorney, Agent, or Firm*—Wolf, Greenfield & Sacks, P.C.

(57) ABSTRACT

The present invention relates to queue-theoretic models for integration of automated call routing systems with human operators. Organizations are increasingly turning to spoken dialog systems for automated call routing to reduce call center costs. To maintain quality service even in cases of failure, these systems often resort to ad-hoc rules for dispatching calls to a human operator. The present invention provides queue-theoretic methods that provide a modeling and simulation capability in support of decisions about the staffing of call-handling centers based on the frequency of incoming calls and the competency of automated dialog systems. The methods include a procedure for identifying when callers should be transferred to operators. The procedure integrates models that predict when a call is likely to fail using spoken dialog features with queuing models of call center volume and service time.

26 Claims, 9 Drawing Sheets

U.S. PATENT DOCUMENTS

| | | | |
|---|---|---|---|
| 5,812,865 | A | 9/1998 | Theimer et al. |
| 5,848,131 | A | 12/1998 | Shaffer et al. |
| 5,896,448 | A * | 4/1999 | Holt ..................... 379/221.03 |
| 5,995,805 | A * | 11/1999 | Ogasawara et al. ......... 455/13.1 |
| 6,115,462 | A * | 9/2000 | Servi et al. ............. 379/221.06 |
| 6,353,398 | B1 | 3/2002 | Amin et al. |
| 6,466,232 | B1 | 10/2002 | Newell et al. |
| 6,480,598 | B1 * | 11/2002 | Reding et al. .......... 379/265.01 |
| 6,490,698 | B1 * | 12/2002 | Horvitz et al. ................. 714/46 |
| 6,513,046 | B1 | 1/2003 | Abbott, III et al. |
| 6,549,915 | B2 | 4/2003 | Abbott, III et al. |
| 6,672,506 | B2 | 1/2004 | Swartz et al. |
| 6,741,188 | B1 | 5/2004 | Miller et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,798,876 | B1 * | 9/2004 | Bala ..................... 379/265.12 |
| 6,801,223 | B1 | 10/2004 | Abbott et al. |
| 6,807,274 | B2 * | 10/2004 | Joseph et al. .......... 379/265.01 |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,385,501 | B2 | 6/2008 | Miller et al. |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0035532 | A1 | 2/2003 | Ganesan |
| 2003/0046401 | A1 | 3/2003 | Abbott et al. |
| 2003/0154476 | A1 | 8/2003 | Abbott, III et al. |
| 2004/0005047 | A1 * | 1/2004 | Joseph et al. .......... 379/265.01 |
| 2004/0098274 | A1 | 5/2004 | Dezonno et al. |
| 2004/0201500 | A1 | 10/2004 | Miller et al. |
| 2005/0034078 | A1 | 2/2005 | Abbott et al. |
| 2005/0041796 | A1 | 2/2005 | Joseph et al. |
| 2005/0192936 | A1 * | 9/2005 | Meek et al. .................... 707/3 |
| 2005/0266858 | A1 | 12/2005 | Miller et al. |
| 2005/0272442 | A1 | 12/2005 | Miller et al. |
| 2006/0019676 | A1 | 1/2006 | Miller et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University. 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proeeedings USENIX Symposium on Mobile and Location Independent Computing, Aug. 1993, 9 pages.

Mike Spreitzer, et al., Architectural Considerations for Scalable. Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 6 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory. The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent A System for Augmented Memory. Personal Technologies Journal Special Issue on Wearable Computing, 1997, 12 pages.

Workshop on Wearable Computing Systems, Aug. 19-21, 1996.

Mark Billinghurst, Research Directions In Wearable Computing, University of Washington, May 1998, 48 pages.

Mark Weiser, The Computer for the 21st Century, Scientific American, Sep. 1991, 8 pages.

Eric Horvitz. Principals of Mixed-Initiative User Interfaces. Proceedings of the ACM SIGCHI Conference on Human Factors in Computing Systems, Pittsburgh, PA. May 1999, pp. 159-166.

C. Larcinese. European Search Report. The Hague, The Netherlands. Apr. 21, 2005, 2 pages.

David W. Ashley, An Introduction to Queuing Theory in an Interactive Text Format, INFORMS Transactions on Education, 2002, pp. 96-98, vol. 2-Issue 3.

David Maxwell Chickering, The WinMine Toolkit, Microsoft Research, 2002, 3 pages.

Diane J. Litman, et al., Designing and Evaluating an Adaptive Spoken Dialogue System, User Modeling and User-Adapted Interaction, 2002, pp. 111-137, vol. 12, Kluwer Academic Publishers, Netherlands.

Bernhard Suhm, et al., A Comparitive Study of Speech in the Call Center: Natural Language Call Routing vs. Touch-Tone Menus, CHI 2002, Apr. 20-25, 2002, pp. 283-290. vol. 4-Issue 1, Minneapolis, Minnesota, USA.

Marilyn A. Walker, et al., Automatically Training A Problematic Dialogue Predictor for a Spoken Dialogue System, Journal of Artificial Intelligence Research, Dec. 1, 2001, pp. 387-413.

Marilyn Walker, et al., Learning to Predict Problematic Situations in a Spoken Dialogue System: Experiments with How May I Help You?, Proceedings of NAACL-2000, 2000, pp. 210-217.

Irene Langkilde, et al., Automatic Prediction of Problematic Human-Computer Dialogues in 'How May I Help You?', Proceedings of IEEE Workshop on Automatic Speech Recognition and Understanding. 1999. 4 pages.

Diane J. Litman, et al., Automatic Detection of Poor Speech Recognition at the Dialogue Level, Proceedings of ACL-99, 1999, 8 pages.

David Maxwell Chickering et al., A Bayesian Approach to Learning Bayesian Networks, Microsoft Research, Aug. 1997, pp. 1-19.

Gregory R. Tatchell, Problems with the Existing Telephony Customer Interface: The Pending Eclipse of Touch-Tone and Dial-Tone, CHI 96, Apr. 13-18, 1996, pp. 242-243.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

OA Dated Jul. 28, 2008 for U.S. Appl. No. 10/610,486, 22 pages.

Ashley, An Introduction to Queuing Theory in an Interactive Text Format, INFORMS Transactions on Education, 2002, pp. 96-98, vol. 2-Issue 3.

Chickering et al., A bayesian Approach to Learning Bayesian Networks with Local Structure, Microsoft Research, Aug. 1997, pp. 1-19.

Chickering, The WinMine Toolkit, Microsoft Research, 2002, 3 pages.

Langkilde, et al., Automatic Prediction of Problematic Human-Computer Dialogues in "How May I Help You?" Proceedings of IEEE Workshop on Automatic Speech Recognition and Understanding, 1999, 4 pages.

Litman, et al., Automatic Detection of Poor Speech Recognition at the Dialogue Level, Proceedings of ACP-99, 1999, 8 pages.

Litman, et al., Designing and Evaluating an Adaptive Spoken Dialogue System, User Modeling and User-Adapted Interaction, 2002, pp. 111-137, vol. 12, Kluwer Academic Publishers, Netherlands.

OA Dated Oct. 22, 2008 for U.S. Appl. No. 10827873, 29 Pages.

Suhm, et al., A comparitive Study of Speech in the Call Center: Natural Language Call Routing vs. Touch-Tone Menus, CHI 2002, Apr. 20-25, 2002, pp. 283-290, vol. 4-Issue 1, Minneapolis, Minnesota, USA.

Tatchell, Problems with the Existing Telephony Customer Interface: The Pending Exlipse of Touch-Tone and Dial-Tone, CHI 96, Apr. 13-18, 1996, pp. 242-243.

Walker, et al., Automatically Training a Problematic Dialogue Predictor for a Spoken Dialogue System, Journal of Artificial Intelligence Research, Dec. 1, 2001, pp. 387-413.

Walker, et al., Learning to Predict Problematic Situations in a Spoken Dialogue System: Experiments with How May I Help You?, Proceedings of NAACL-2000, 2000, pp. 210-217.

* cited by examiner

QUEUE-THEORETIC MODELS FOR IDEAL INTEGRATION OF AUTOMATED CALL ROUTING SYSTEMS WITH HUMAN OPERATORS

RELATED APPLICATIONS

This application is a continuation-in-part of U.S. patent application Ser. No. 10/610,486 filed on, Jun. 30, 2003 and entitled IDEAL TRANSFER OF CALL HANDLING FROM AUTOMATED SYSTEMS TO HUMAN OPERATORS BASED ON FORECASTS OF AUTOMATION EFFICACY AND OPERATOR LOAD.

TECHNICAL FIELD

The present invention relates generally to systems and methods that facilitate communications between devices, systems, processes, and/or individuals. More particularly, the present invention relates to a principled procedure for determining when callers should be transferred to operators based on a decision analysis. The procedure integrates models that predict when a call is likely to fail using spoken dialog features with queuing models of call center volume and service time.

BACKGROUND OF THE INVENTION

Many users have had experiences with the use of automated speech-recognition based call routing systems for accessing data and services by telephone. Such systems have proliferated lately with the advent of more accurate spoken command-and-control and continuous speech recognition systems for limited domains. Even when the scope of an application is restricted, however, such systems can produce frustrating failures. To address user frustration, many designers put in place options for callers to be immediately routed to a live, human operator. Beyond speech recognition systems, other automated systems have been deployed such as the use of touch-tone driven menu systems. Such systems may frustrate users in providing a fixed set of options that either may not appear to offer the right options, offer options that have understandable relevance, and/or may appear to route the caller to a frustrating sequence of options rather than converging quickly to a desired setting.

Automated call handling systems have provided organizations with an opportunity to reduce the costs of handling incoming calls. As a consequence, many companies utilize touch-tone or dial-tone interactive voice-response systems. Unfortunately, callers frequently complain that touch-tone menus are difficult to use and frustrating. Callers in fact frequently seek assistance from a live operator at the first opportunity. To improve user experience with call handling systems, many companies have been turning to spoken dialog systems. These systems utilize automatic speech recognition (ASR) to facilitate requests in natural language. Although customers generally prefer natural language to touch-tone menus, enterprises are discovering that they still fall short of the quality of service that a human operator can provide.

In attempting to provide the best of both automation and live customer service, spoken dialog systems often resort to ad-hoc rules for dispatching calls. Even when these rules are tuned from data, the decision to transfer a call typically does not take into consideration the real-time stakes, such as the cost of customer time and the loss of return on investment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to optimizing automated call routing systems by integrating spoken dialog models with queuing models. A principled procedure and systems design framework is provided that is based on decision theory for determining when callers should be dispatched and how many operators call centers should maintain to minimize support costs. The procedure integrates models that predict when a call is likely to fail based on spoken dialog features with queuing models of call center volume and service time.

Using features from speech engines, a natural language understanding component, and dialog manager, as well as hand-labeled features, classifiers were trained to predict failures before they happen based on observations available to conventional systems after the first exchange, second, third, and so forth. The present invention goes beyond such analyses to further include an optimization of the decision about when to transfer a caller to a live, human operator. The optimization considers the costs and benefits of engaging in dialog strategies, and as such, does not take for granted that when the system is likely to fail, the caller should be transferred immediately to an operator, since this decision depends on the estimated time to failure as well as the estimated length of time that the caller may be waiting in a queue. The queue-theoretic model provides a modeling and simulation capability that can be used for exploration and design of call center staffing. A decision-theoretic procedure of the subject invention incorporates such cost considerations so as to allow a call center to strike a balance between keeping customers in the automated system—taking a gamble that the system will ultimately succeed, versus transferring calls to a live operator at different points in time, based on incoming spoken dialog features extracted in real-time.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The subject invention employs decision theory in connection with managing calls. More particularly, management of call traffic and handling of specific calls is important to many businesses, and the subject invention employs decision theory and queuing models in connection with optimizing handling of calls. In one aspect, an optimized procedure is provided, wherein decision models are employed to optimize system dispatch of calls to live operators in order to minimize support costs on an enterprise level while concurrently exploiting real time probabilities that the system will ultimately succeed.

As used in this application, the terms "component," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic; that is, the computation of a probability distribution over states of interest based on a consideration of data and events. Inference can also refer to logical inferences, including deterministic techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
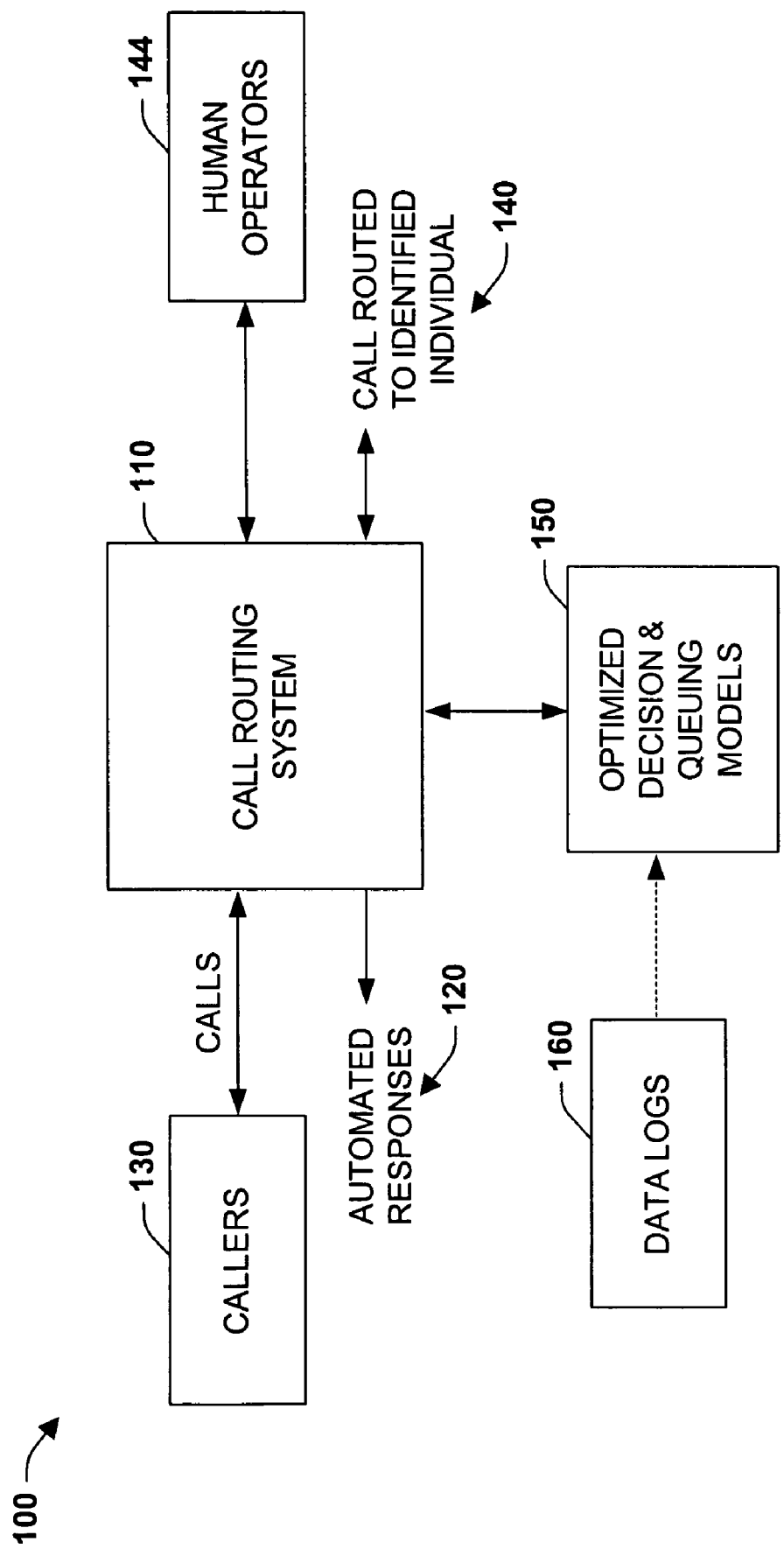
FIG. 1 is a schematic block diagram illustrating an automated call routing and decision system in accordance with an aspect of the present invention.

Referring initially to FIG. 1, a call routing and decision system 100 is illustrated in accordance with an aspect of the present invention. The system 100 includes an automated call routing system 110 that is routinely employed for providing automated responses 120 to one or more callers 130. These systems include processing components, switching components, electronic directories, and associated software such as speech recognition components for communicating with the callers 130 and routing calls to an identified individual or receiver at 140 (e.g., voice command indicating individuals last name, or a conference room name). If callers 130 have trouble making a connection with an individual or party, the call routing system 110 can connect to a human operator 144 to provide further assistance to the callers. The present invention attempts to mitigate transferring the callers 130 to the human operators 144 in order to minimize enterprise support costs while also reducing caller frustration when remaining in the automated routing system 110.

One or more optimized decision and queuing models 150 are employed with the call routing system 110 to facilitate efficient operations of the system 100, provide more efficient coupling between callers and respondents, and mitigate caller frustration when interacting with such systems. This achieved in part by training the models 150 via a data log 160 that has recorded data of past activities and interactions with the call routing system 110. Output from the models 150 is then employed for call routing determinations. After the models 150 have been trained, the call routing system 100 works in concert with the models 150 to facilitate call routing between callers and individuals to be contacted. As will be described in more detail below, an optimized decision model associated with the automated call routing system 110 determines when calls are likely to fail and a queuing model determines a busyness state of the operator 144. The decision model and the queuing model cooperate to balance costs between directing the calls to the operator 144 and directing the calls through the automated call routing system 110.

Figure 2:
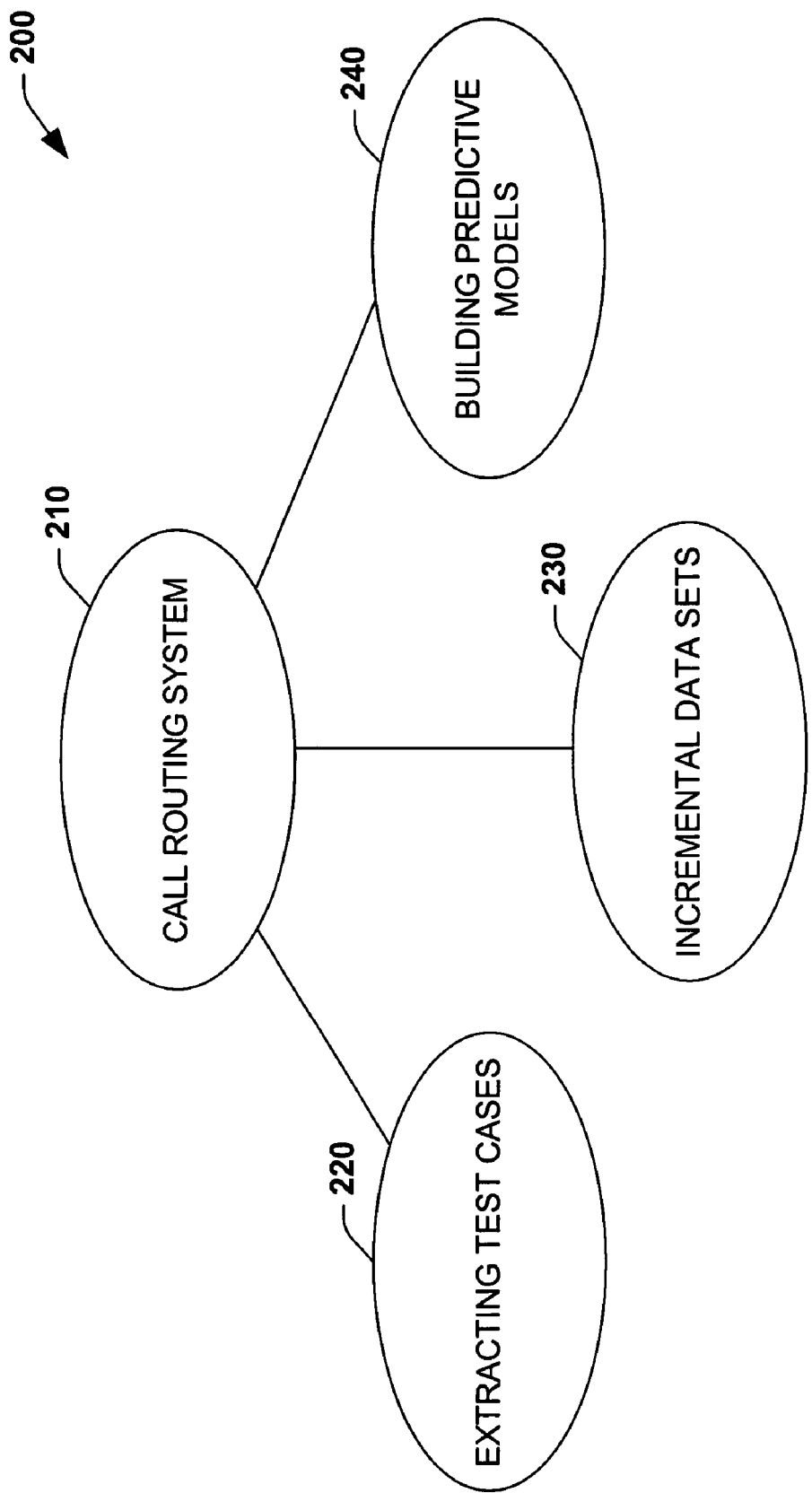
FIG. 2 is a diagram illustrating a modeling procedure in accordance with an aspect of the present invention.

Referring now to FIG. 2, a modeling procedure 200 is illustrated in accordance with an aspect of the present invention. Before proceeding, it is noted that the procedure outlined with respect to FIG. 2 provides an initial modeling framework that is then optimized in accordance with decision-theoretic principals as described in more detail with respect to FIGS. 3-7.

The procedure 200 begins with an analysis of call routing system 210 such as a commercially available spoken dialog system called VoiceDialer, for example. The system fields internal calls for directory assistance but can also be adapted for external calls. Using speech recognition, VoiceDialer attempts to identify one of over 20,000 name entries in a global address book. Nearly 60,000 session logs collected and analyzed over a period of 11 months. The system succeeded in correctly identifying the proper name in 45% of the sessions. The success rate jumps to 69% when sessions in which the caller did not attempt to engage the system are removed; in such "no name attempt" sessions, accounting for roughly one out of every three sessions, users completely bypassed interaction with the spoken dialog system by either transferring to an operator with a touchtone command or hanging up. Beyond the alarming failure rates and immediate transfers or hang-ups, longitudinal trends revealed that an increasing percentage of callers were immediately requesting the operator. The urgency of these findings motivated a procedure for optimizing dispatch to an operator based on models constructed from features drawn from the session logs.

Proceeding to 220 of FIG. 2, various test cases are extracted from the system. In seeking to extract cases for building predictive models, logs generated by VoiceDialer (or other call routing system) are analyzed. The session logs included transcriptions of system actions as well as the output of a speech recognizer; namely, n-best lists of hypotheses for first and last names with their corresponding confidence scores. Definitions and distribution of final outcomes for sessions, as labeled by the system, are as follows:

SpeakFound (45%): System finds the correct name in the directory, as confirmed by a transfer.
OperatorRequest (23%): Caller presses '0' for an operator.
HangUp (13%): Caller hangs at some point in the session.
MaxErrors (12%): System reaches threshold of allowed misrecognitions and routes the call to an operator.
SpeakNotFound (6%): System concludes that the name is not in the directory and routes the call to an operator.
Undefined (1%): Caller presses other numeric keys.
HelpRequest (<1%): Caller requests help by pressing '*' or '#'.
NotReady (<1%): System is temporarily out of service.

Models are constructed to predict these outcomes from a set of observational features derived from cases encoded in the logs. An area of interest includes inferring the likelihood of the eventual success versus failure of the spoken dialog interaction. For cost-benefit modeling, inferences of probability distributions over the duration of time until success or failure of the system was also determined.

The spoken dialog features extracted from session logs generally fell into four broad categories (listed along with the total number of features for each category):

Sequences of system and user action types (3): Sequences of system actions, such as asking the user to repeat first/last/full name, sequences of user actions such as pressing a key, etc.

Whole dialog features (2): Outcome, total completion time or duration

ASR features (22): Number of hypotheses in the n-best list, range of confidence scores, mode, greatest consecutive score difference (gcdiff), skewness of the scores (skew), maximum score (max), minimum score (min), etc.

Pairwise ASR features (8): Number of recurring first/last/full names that match in consecutive n-best lists, whether the maximum score increased or decreased, etc.

It is noted that these features can be observed in real-time as a dialog session progress, with the exception of whole dialog features, which constitute the target variables.

Proceeding to 230, incremental data sets are considered. Since the optimization procedure harnesses models for real-time decision making over the course of a dialog, data is decomposed into sets of features that are revealed incrementally with dialog progression. The fundamental unit of time is considered to be each posting by the speech engine of Automatic speech Recognizer (ASR) outputs. Data can be segmented by detected ASR outputs for at least two reasons: first, ASR features constituted the vast majority of automatically extractable real-time features, and second, alternative dialog units (e.g., "moves," "adjacency pairs" or exchanges) were unavailable in the transcriptions or provided insufficient discriminatory features.

Four data sets were created with incrementally growing number of features, as summarized in Table 1. The data was split 70/30 for training and testing. Having no ASR output was not included as a data set since not enough features could be extracted, rendering it functionally equivalent to using the marginal distribution in lieu of an inference. Furthermore, data sets with greater than four ASR outputs were not considered since, out of nearly 60,000 session logs, only six such cases were found.

TABLE 1

Summary of incremental data sets.

|  | Features | Train | Test | Total |
| --- | --- | --- | --- | --- |
| Recognition 1 | 32 | 27587 | 11824 | 39411 |
| Recognition 2 | 62 | 13556 | 5811 | 19367 |
| Recognition 3 | 93 | 5625 | 2411 | 8036 |
| Recognition 4 | 122 | 2579 | 1106 | 3685 |

At 240, predictive models are constructed. For model building, Bayesian networks were learned using decision trees to encode local conditional probability distributions within variables using a tool that performs Bayesian structure search (e.g., Chickering, 2002). Decision trees can be learned for both discrete and continuous variables, where splits in the trees are made greedily according to a Bayesian scoring function (e.g., Chickering et al., 1997). Bayesian networks were learned to not only perform inference over joint distributions needed for the decision-theoretic procedure, but also to determine what spoken dialog features would comprise the local structure of about three primary variables of interest: Outcome, as previously defined, Failure, a binary recoding of Outcome with SpeakFound as '1' and '0' for everything else, and, Duration, the expected completion time of the session. It is noted that Duration, a continuous variable for which the decision tree builds a Gaussian distribution, is generally required since cost is typically a function of time.

Table 2 shows a summary of the decision trees that were learned for the target variables in the four data sets. In these cases, the first splits in the decision trees, which represent the feature with the strongest dependency, were ASR features for the most recent n-best list. For example, the decision tree for Outcome trained on available features after the fourth ASR output depended most on the greatest consecutive difference between any two hypotheses for just the last n-best list, and not on any pairwise features between the third and fourth, or the second and third n-best lists, though pairwise features and action sequences were included as dependencies in the tree. It is also noted that Outcome after the fourth recognition only depended on that feature.

TABLE 2

Summary of decision trees for the primary target variables.

| | Recognition 1 | | Recognition 2 | | Recognition 3 | | Recognition 4 | |
| --- | --- | --- | --- | --- | --- | --- | --- | --- |
| Target | First Split | Nodes (Depth) | First Split | Nodes (Depth) | First Split | Nodes (Depth) | First Split | Nodes (Depth) |
| Outcome | skew_1 | 18 (8) | gcdiff_2 | 27 (9) | max_3 | 12 (6) | gcdiff_4 | 1 (2) |
| Failure | skew_1 | 18 (8) | gcdiff_2 | 23 (9) | max_3 | 12 (6) | gcdiff_4 | 13 (6) |
| Duration | skew_1 | 19 (10) | skew_2 | 16 (7) | min_3 | 13 (6) | max_4 | 7 (4) |

Table 3 displays classification accuracies of the decision trees for Outcome and Failure on the test data.

TABLE 3

Classification accuracies for predicting dialog outcome and failure, and their relative improvement.

|  | Recognition 1 | Recognition 2 | Recognition 3 | Recognition 4 |
|---|---|---|---|---|
| Marginal Outcome | 68.7% | 61.8% | 48.3% | 56.8% |
| Outcome (Lift) | 71.5% (2.9%) | 67.0% (5.2%) | 62.9% (14.6%) | 77.1% (20.3%) |
| Marginal Failure | 68.7% | 61.8% | 48.3% | 61.8% |
| Failure (Lift) | 75.9% (7.2%) | 75.1% (13.3%) | 71.3% (23.0%) | 82.3% (20.4%) |

The baselines represent their marginal distributions. Not surprisingly, the Failure models outperformed the Outcome models, with a maximum accuracy of 82% for the data after the fourth recognition. Consistent with intuition, the lift above the marginal gradually rises, with the highest gain relative to the baseline at 23%. Observing the classification accuracy for Outcome after the fourth recognition, despite the fact that there was only one dependency, as stated previously, the model performed 20% better than the baseline. While the lifts for the third and fourth recognitions seem impressive, the baselines are notably low, attesting to the poor performance of convention spoken dialog systems.

The log posterior of the data given the models are reported in Table 4. To evaluate the relative performance of the learned Gaussians for Duration over the marginal log score, models were trained using just that as the target variable. Thereafter, models included Outcome or Failure as the second target variable. It is noted that positive log scores reflect a non-normalized Gaussian density function. The maximum lift above the marginal was 0.24, though unlike the classification accuracies, the lifts for the log scores do not exhibit a trend upward. On the other hand, the log scores in general do seem to improve with more features.

TABLE 4

Log posterior scores for the learned Bayesian network models and their corresponding lifts above the marginal model.

|  | Recognition 1 | Recognition 2 | Recognition 3 | Recognition 4 |
|---|---|---|---|---|
| Marginal Duration | −0.38 | −0.28 | −0.15 | −0.09 |
| Duration (Lift) | −0.05 (0.33) | −0.06 (0.22) | 0.04 (0.19) | 0.11 (0.20) |
| Marginal Duration + Outcome | −0.71 | −0.72 | −0.65 | −0.49 |
| Duration + Outcome(Lift) | −0.50 (0.21) | −0.52 (0.20) | −0.48 (0.18) | −0.25 (0.24) |
| Marginal Duration + Failure | −0.50 | −0.47 | −0.42 | −0.38 |
| Duration + Failure (Lift) | −0.30 (0.20) | −0.30 (0.18) | −0.25 (0.17) | −0.15 (0.23) |

Figure 3:
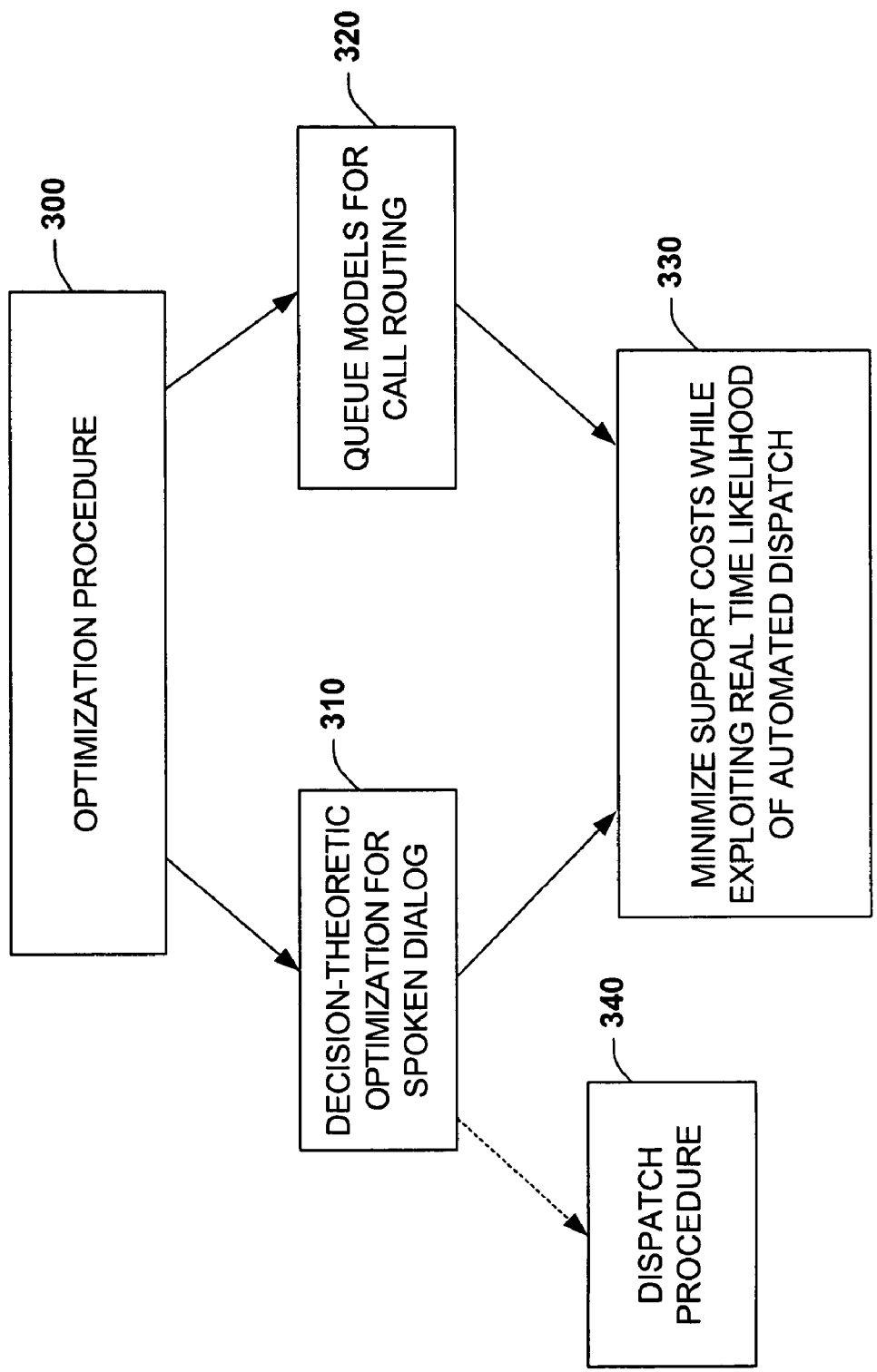
FIG. 3 is a diagram illustrating a model optimization procedure in accordance with an aspect of the present invention.

Turning to FIG. 3, an optimization process 300 is illustrated in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 4:
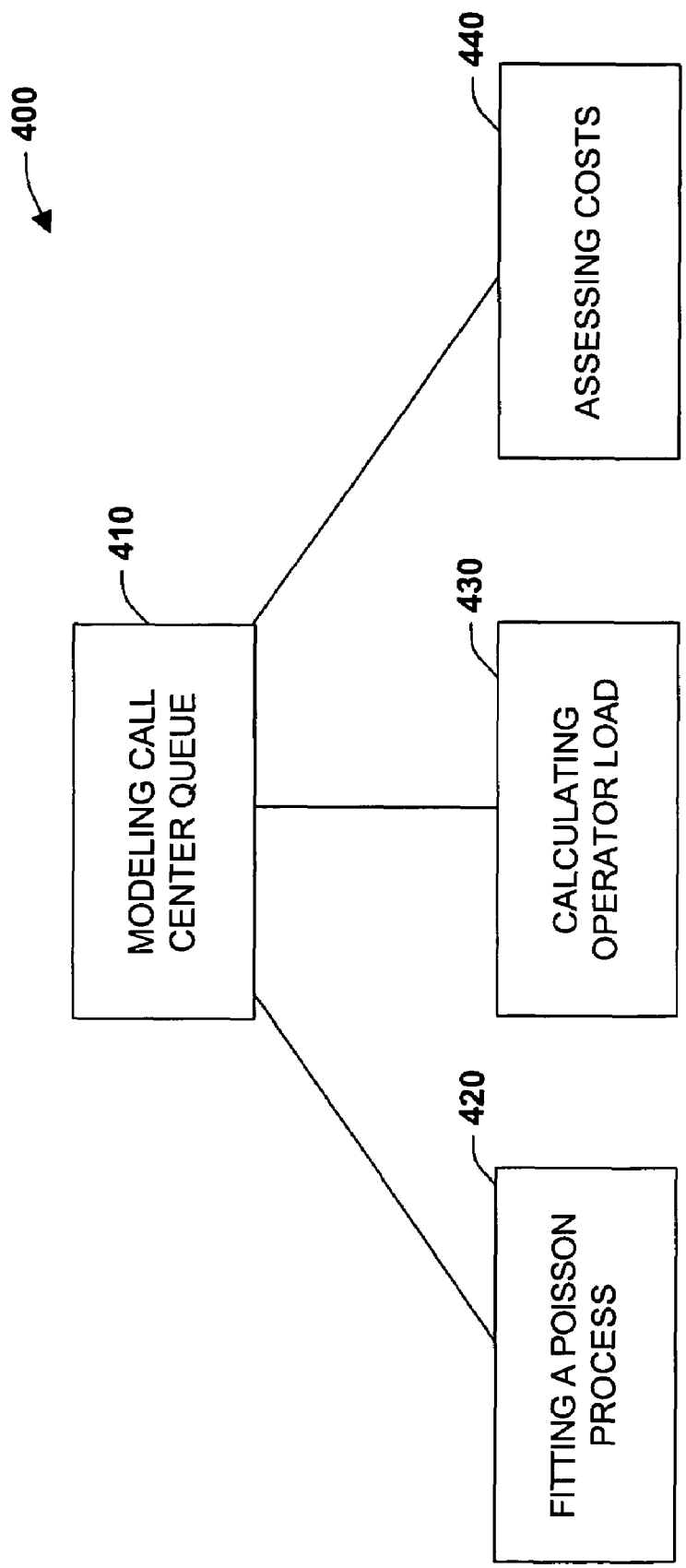
FIG. 4 illustrates modeling for a call center queue in accordance with an aspect of the present invention.

The optimization procedure 300 includes a decision-theoretic procedure 310 for analyzing spoken dialog and an integration with queue models 320 for call routing activities which are described in more detail with respect to FIG. 4. The integration of these models and procedures leads to an outcome 330 that attempts to minimize support costs of an organization with respect to human transfer of calls while concurrently exploiting or maximizing the likelihood of a real time automated dispatch of a call. A dispatch procedure 340 is described in more detail below.

With respect to the decision-theoretic procedure 310, one purpose of building models that can predict the likely outcome of a call with a spoken dialog system using real-time, extractable features is to employ them for optimal decision making. Optimization can be approached from many angles. Given that the goal of optimizing dispatch to a live operator is to minimize support costs at the enterprise level, while at the same time exploiting real-time likelihoods, probability and utility are combined within the framework of decision theory. As such, decisions are made according to the principle of maximum expected utility (MEU), which states that the action A=a should be selected that maximizes its expected utility, $EU(a/\xi)$. If $\xi$ denotes background information and H represents possible states of the world, then select actions guided by the following optimization:

$$\operatorname*{argmax}_{a} EU(a \mid \xi) = \operatorname*{argmax}_{a} \sum_{h} P(H = h \mid \xi) u(a, h) \qquad (1)$$

where u(a,h) expresses the utility of taking action a when the state of the world is h. Note that cost is simply negative utility. The MEU Principle is implied by compelling assertions about preferences, collectively referred to as the axioms of utility theory (Von Neumann & Morgenstern, 1947).

Relating the MEU principle to the process of optimizing dispatch, let d denote the action of dispatching a call. Furthermore, let S denote the possible outcomes of the call routing system, which, for the sake of simplicity, corresponds to the binary variable Failure. Since transferring a call when the operator is busy poses a problem, let O denote the state of the operators, which may be busy or not busy. Rewriting (1) to include both O and S, the following optimization procedure is obtained:

Dispatch Procedure 340: Dispatch a call to an operator when the expected utility of d, given the state of the operator O and call routing system S, exceeds that of any dialog action a. That is, $$\forall_{a \sim d}[EU(d|S,O) > EU(a|S,O)] \quad (2)$$

In particular, for dispatch d, applying the definition of conditional probability to obtain:

$$EU(d) = \sum_S \sum_O P(S, O \mid d) u(d, S, O) \quad (3)$$

Calculating the expected utility of a dispatch, as delineated in equation (3), involves three components: first, P(O|S,d), or the likely state of the call center queue; second, P(S), or the likely outcome of the call routing system; and third, u(d,S,O), or the utility of dispatching a call when the operators may or may not be busy and the system may or may not be failing. The first component includes stochastic modeling of the call center queue. The second component was discussed in the previously above, and the third component involves the application of standard cost functions in operations research. The first and last components are described in detail below.

It is noted that generally the only dialog action that affects O, whether or not the operator is busy, is d since a transfer increases the number of callers waiting to be serviced by the operator. The effect of other dialog actions taken by a call routing system remain within the system, and as such:

$$P(O|S, \neg d)P(S) = P(O|\neg d)P(S) \quad (4)$$

In other words, O and S are probabilistically independent for all other dialog actions, though for simplicity, the action of keeping someone engaged with the spoken dialog system is the variable considered.

Figure 5:
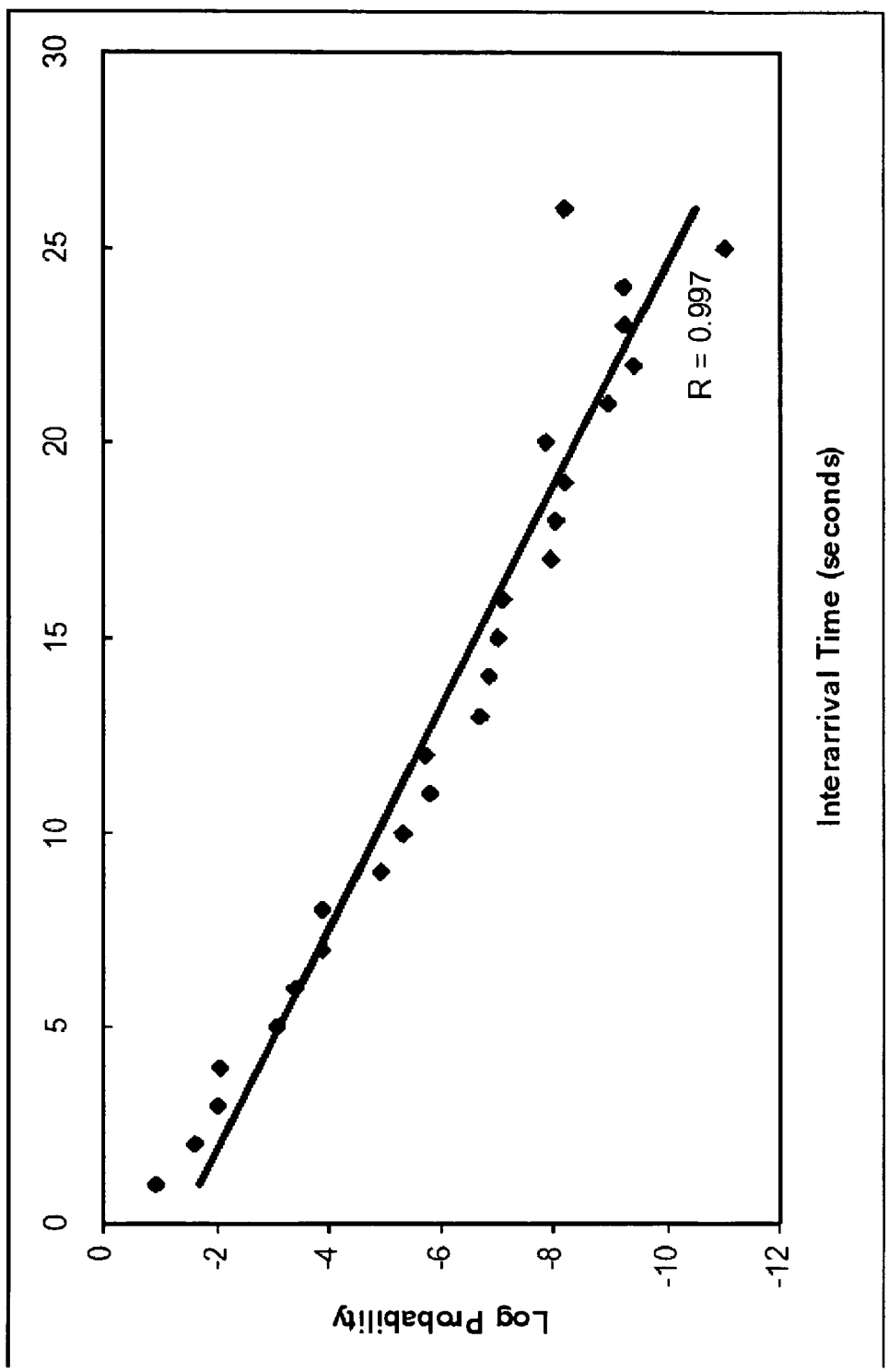
FIG. 5 is a diagram illustrating linearity of log transformed inter-arrival times in accordance with an aspect of the present invention.
Figure 6:
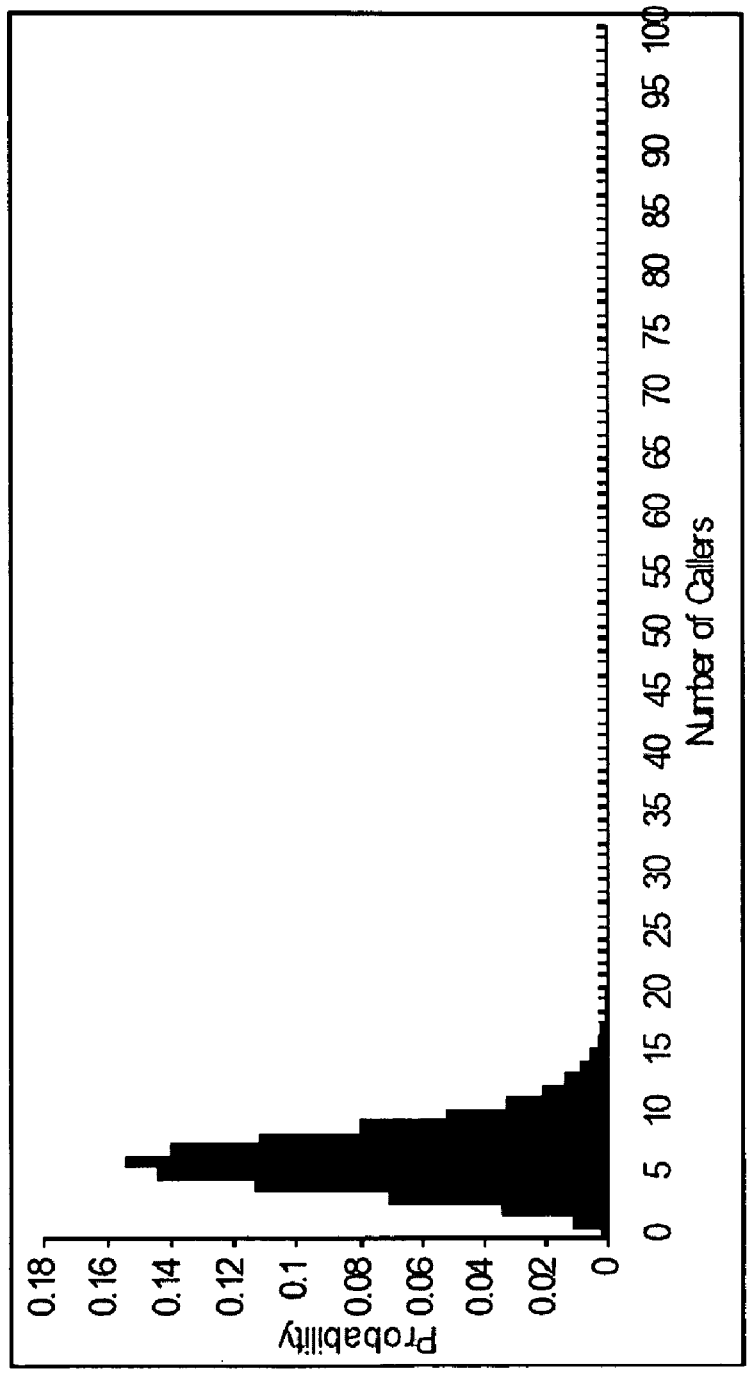
FIG. 6 is a diagram illustrating distribution of the likely number of callers in a call center in accordance with an aspect of the present invention.
Figure 7:
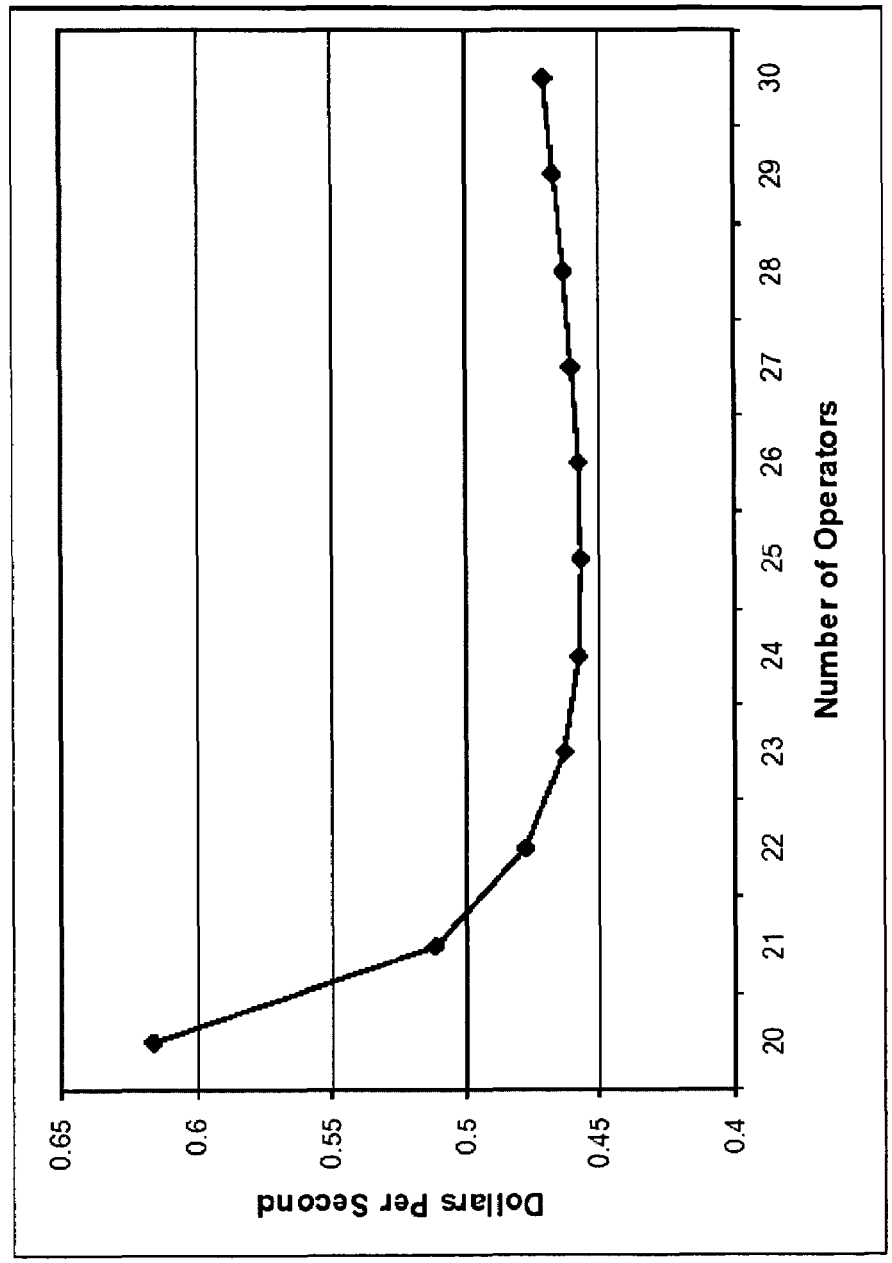
FIG. 7 illustrates optimizing the number of operators that would have been required to handle calls to an automated call routing system in accordance with an aspect of the present invention.

Referring now to FIG. 4, a queue modeling process 400 is illustrated in accordance with an aspect of the present invention. Before proceeding, it is noted that FIGS. 5-7 are discussed in accordance with various aspects of FIG. 4. At 410, modeling a Call Center Queue is illustrated. While modeling a call center may require more than simple parameter estimation, calculating whether or not the operators are busy, when the queuing models have been fit, entails either closed-form solutions or can be estimated using Monte Carlo methods. Since the calculations depend on what type of queuing models evince the best goodness-of-fit, the following describes how the models are fit using data collected from the call center at an example organization, and then describe associated calculations.

At 420, fitting a Poisson Process is illustrated. Many queues, and in particular, call centers, are generally governed by two parameters: $\lambda$, the average arrival rate into the call center, and $\mu$, the average service time to complete a call when an operator receives it. If the counts of inter-arrival and service times follow an exponential distribution, which exhibits the memoryless property of being probabilistically independent of any previous call, the process over time is called a "Poisson process" (Gross & Harris, 1998).

Since a Poisson process is mathematically well-characterized, it was sought to ascertain whether the call center of an organization could be modeled as such. For that effort, about two months of call center data was obtained for weekday working hours. Over 1700 calls were received with varying service completion times. The average rates, which represent the maximum likelihood estimate and method of moments estimate for the exponential distribution, were 4.41 seconds ($\lambda$) between calls and 28.22 seconds ($\mu$) to dispense a call. To verify that the distributions were exponential, a log transformation of the empirical distributions was performed and fit regression lines to estimate the correlation coefficients. FIG. 5 illustrates a graph 500 that shows a linear regression fit for the inter-arrival times. The correlation for the arrival rate (r=0.997) was significant (t(26)=63.06, p<0.001), and likewise, the correlation for service rate (r=0.710) was significant (t(24)=4.69, p<0.001). Hence, the fit arrival and service processes were quite reasonably Poisson.

At 430 of FIG. 4, operator load is calculated. Given that the arrival and service rates for the call center were Poisson processes, estimated $\lambda$ and $\mu$ parameters were employed to model an M/M/s queue, which denotes a queue in which the arrival process is memoryless, as well as the service process, and the number of servers is s, though z is used to avoid confusion with S, the state of the system. The call center at the example organization employs 10 operators or servers. Returning to the first component of equation (3) above, calculating the likelihood that all the operators are busy in a call center if a call is dispatched for an M/M/z queue is as follows:

$$P(O \mid S, d) = P(n \geq z) \quad (5)$$

$$P(O \mid S, d) = \left(1 - \sum_{n=0}^{z} P_n\right)$$

where n represents the number of callers, and Pn is a closed form solution for multiple servers that can be found in any queuing theory textbook (e.g., Gross & Harris, 1998). According to (5), an operator is busy when the number of callers in the queue, including the dispatch call from the automated system, exceeds the number of operators at the call center.

FIG. 6 is a diagram 600 that displays the distribution over the likely number of callers in the queue for an M/M/z queue using the fitted parameters from the call center data and 10 operators. According to this distribution, the likely number of callers at any given time is about 7. To verify the appropriateness of the queuing model, all such implications were checked with the supervisors of the call center, including total waiting time, and found that the M/M/z queue made accurate predictions regarding call center statistics.

At 440 of FIG. 4, costs assessments were made. Having delineated how to calculate the likelihood of the operators being busy, and how to predict the likelihood of success using spoken dialog features, the last component of decision-theoretic procedure in equation (3), includes an assessment of the utility of dispatching a call given the state of the operators and the spoken dialog system. In many respects, the utilities drive the optimization in that ultimately a company has to defray the expense of maintaining a call center. Most automated call routing systems simply base their decisions on ad-hoc rules based on ASR features and the like, but not on the stakes involved. These rules are distinguished from the procedure in the present invention that bases its decisions on the overall cost and benefit of running a call center with both an automated call routing system and a staff of human operators, weighted by the efficiency and performance of both. These decisions can be made in real-time as an ongoing dialog with a caller progresses. Since queuing models are integrated with dialog models, the cost-benefit analysis allows call center managers to determine if fewer operators are needed as the automated system improves its performance, and vice versa. In other words, the integration provides a framework for optimizing call center design with support costs playing the principal role. The utility of a dialog action a given the operator state O and system state S can be approximately decomposed as follows:

$$u(a,S,O) \approx u(a,S) + u(a,O) \quad (6)$$

Suppose a=d, or dispatch to an operator. Then, equation (6) can be further decomposed into the cost function (note c instead of u):

$$c(d,S,O) \approx CustCost \cdot (t+W) + OpCost \cdot z \quad (7)$$

where t is the time a caller has already spent in the automated system, and W is the "dwell time," which includes the time waiting in line and the time being served (Gross & Harris, 1998). W is derived from the M/M/z queuing model. According to equation (7), the cost of dispatching a call is merely the cost of a caller's time with the automated system in the call center, plus the cost of employing z operators for that call. If the state of O is "Not Busy," then the W term drops out. If the state of S is "System Failing," then add to equation (7) another term; namely, the return on investment (ROI). The ROI in this context is the amount of capital that the organization would have saved in not hiring more operators.

In order to calculate ROI for the call center, an inter-arrival rate of calls entering the spoken dialog system as a Poisson process was modeled. The average arrival rate was 1.51 seconds, and a linear regression line fit to the log transformation of the empirical distribution revealed a significant correlation ($r=0.997$, $t(30)=65.9$, $p<0.001$), indicating an exponential distribution. Since the average service time of the operators remains similar, an M/M/z queuing model and equation (7) were employed, without the variable t, which is unknown, to determine the optimal number of operators. The optimal number of operators needed to field the calls that would have been handled by the automated system is 25, as shown in FIG. 7. It is noted that this is a conservative estimate since operators not only handle those calls dispatched from the automated system but also direct operator lines. ROI is then simply Op-Cost·25. The same optimization was also performed using the inter-arrival rate for the call center, and found that the optimal number of operators was 11, one more than the call center was currently employing, though apparently two supervisors are always on hand to take calls to avoid overly lengthy queues.

If the dialog action is not dispatch, but ¬d, keeping a caller in the automated spoken dialog system, then the second term of equation (7) drops out since the cost of a caller's time is only considered. Furthermore, if the state of S is "System Not Failing," then having kept the caller in the system would have saved ROI. Hence, ROI is to be subtracted from the cost function. Also, the future cost of remaining in the system is considered for an estimated amount of time longer than t, the equivalent of W in the queuing model. Fortunately, Gaussian models were learned from the session logs discussed above to estimate this kind of duration.

Putting everything together, the spoken dialog models learned with respect to discussion of FIGS. 2 and 3, can be combined with the fitted M/M/z queuing models, along with the cost functions for d and ¬d for every cross product of S and O within the decision-theoretic procedure for optimizing dialog actions delineated in equation (6). To assess the effectiveness of the procedure, the same test data for evaluating the spoken dialog models was employed to examine how many calls the procedure would have dispatched after each ASR output given the incrementally growing number of spoken dialog features. As a comparison, an alternative baseline procedure of using the marginal distribution to decide whether to dispatch was considered. In other words, if the most likely state of S, or the binary variable Failure, is "System Not Failing," then keep the call in the system; otherwise, dispatch the call.

Table 5 displays the results of the analysis on each test set comparing the decision theoretic (DT) procedure against the marginal procedure (Marg). The second row corresponds to the "false positive" cases; that is, dispatching a call that was actually a success. The DT procedure is fairly conservative about making false positives consistently dispatching less than 7% of the calls, whereas the marginal procedure continually increases its false positives, reaching 28% by the last ASR output.

TABLE 5

Percentage of failure and success calls that would have been dispatched by the decision theoretic (DT) procedure and by an alternative procedure using the marginal (Marg)

| | Recognition 1 | | | Recognition 2 | | | Recognition 3 | | | Recognition 4 | | |
|---|---|---|---|---|---|---|---|---|---|---|---|---|
| Outcome | Total | Marg | DT | Total | Marg | DT | Total | Marg | DT | Total | Marg | DT |
| Failure | 31.3% | 48.4% | 1.5% | 38.2% | 55.7% | 30.9% | 51.7% | 61.2% | 30.7% | 61.8% | 88.9% | 52.6% |
| Success | 68.7% | 11.6% | 6.8% | 61.8% | 12.9% | 2.9% | 48.3% | 17.9% | 2.5% | 38.2% | 28.4% | 4.7% |

The first row of Table 5 corresponds to those "true positive" cases in which the calls that would have ultimately failed were dispatched correctly. The DT procedure starts off conservatively dispatching cases, since it deems keeping callers in the spoken dialog system more cost efficient in the beginning of a call session, whereas the marginal procedure immediately transfers close to half of the calls. As more recognition results are received and the percentage of calls that ultimately fail in the system increase, the DT procedure gradually lifts the percentage of dispatch, even transferring over half of the failed calls by the fourth ASR output. Although the marginal procedure also demonstrates a similar trend, it does so in a more aggressive manner.

To better appreciate how the DT procedure balances the tradeoffs between dispatching a call to the call center and keeping it within the automated system, the average cost savings can be approximately monetized for each test data set as follows:

$$AverageSavings = \frac{\sum_n |ec(d) - ec(\neg d)|}{n} \qquad (8)$$

The intuition behind equation (8) is that if the expected cost of dispatching is greater than not dispatching and it is decided to stay in, money would then be saved. Conversely, if the expected cost of staying in is greater than dispatching and it is decided to transfer the call, again money is saved. Equation (8) determines the average amount of money saved for both decisions.

Table 6 displays the average cost savings using the DT procedure for all four data sets. The procedure saves more money in the first recognition, where it keeps calls in the system at a point when the probability of success is highest, and again in the fourth recognition, where it dispatches calls to the call center at a point when the probability of success is lowest. Looking only at the average savings when the expected cost of dispatch is lower than the expected cost of keeping a caller in the automated system, a gradually increasing trend of cost savings can be observed, with the highest savings at roughly 3 cents per second.

TABLE 6

Average cost savings in dollars per second using the decision theoretic procedure.

|  | Average Savings | Dispatch Only |
| --- | --- | --- |
| Recognition 1 | $0.1952 | $0.0010 |
| Recognition 2 | $0.1399 | $0.0065 |
| Recognition 3 | $0.1565 | $0.0101 |
| Recognition 4 | $0.1973 | $0.0288 |

As described above, the present invention provides a decision-theoretic procedure for determining when callers should be dispatched to a live operator so as to minimize support costs at the enterprise level. The procedure integrated learned models of call failure and success based on extractable real-time spoken dialog features with queuing models of call center volume and service time. The spoken dialog models predicted failure with a maximum accuracy of 82%, a 20% relative lift above the baseline. Using an M/M/z queue fit to call center data, the procedure was evaluated against making decisions from the marginal distribution. The procedure was shown to be conservative about making false positives. For true positives, the procedure reliably dispatched more calls as the probability of success diminished.

One possible limitation in the evaluation of the procedure was that the increase in average arrival rate into the call center was not accounted for as the procedure dispatched more calls. In a live system, the average rate of dispatch can be monitored, and adjust the average rate of arrival in the queuing models of the call center accordingly. Also, while this invention addresses the problem of optimizing dispatch at the enterprise level, the same framework can be applied to optimizing more individualized costs and utilities, such as user frustration, or to simply minimizing just the caller's time, regardless of call center costs.

Figure 8:
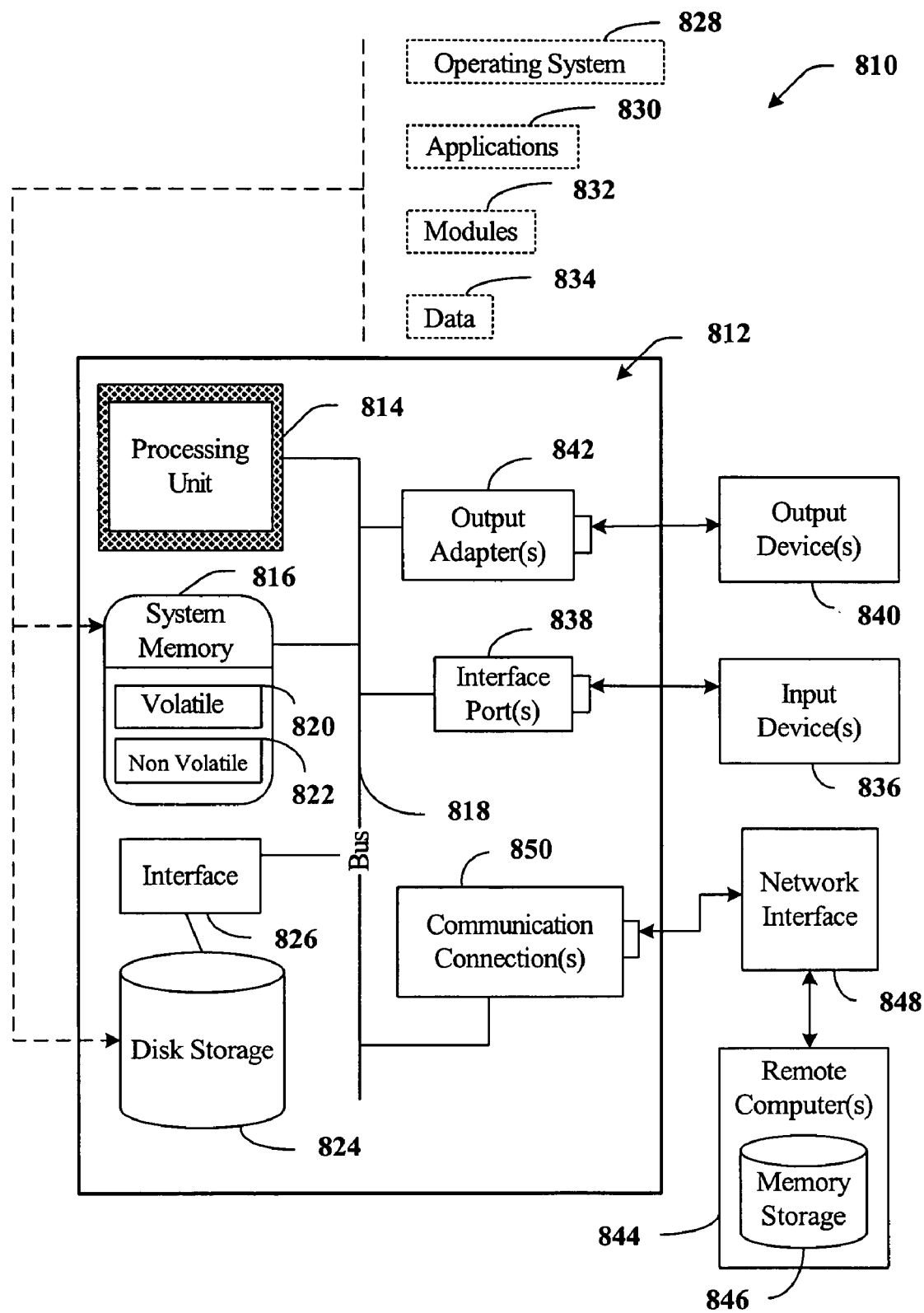
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814.

The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
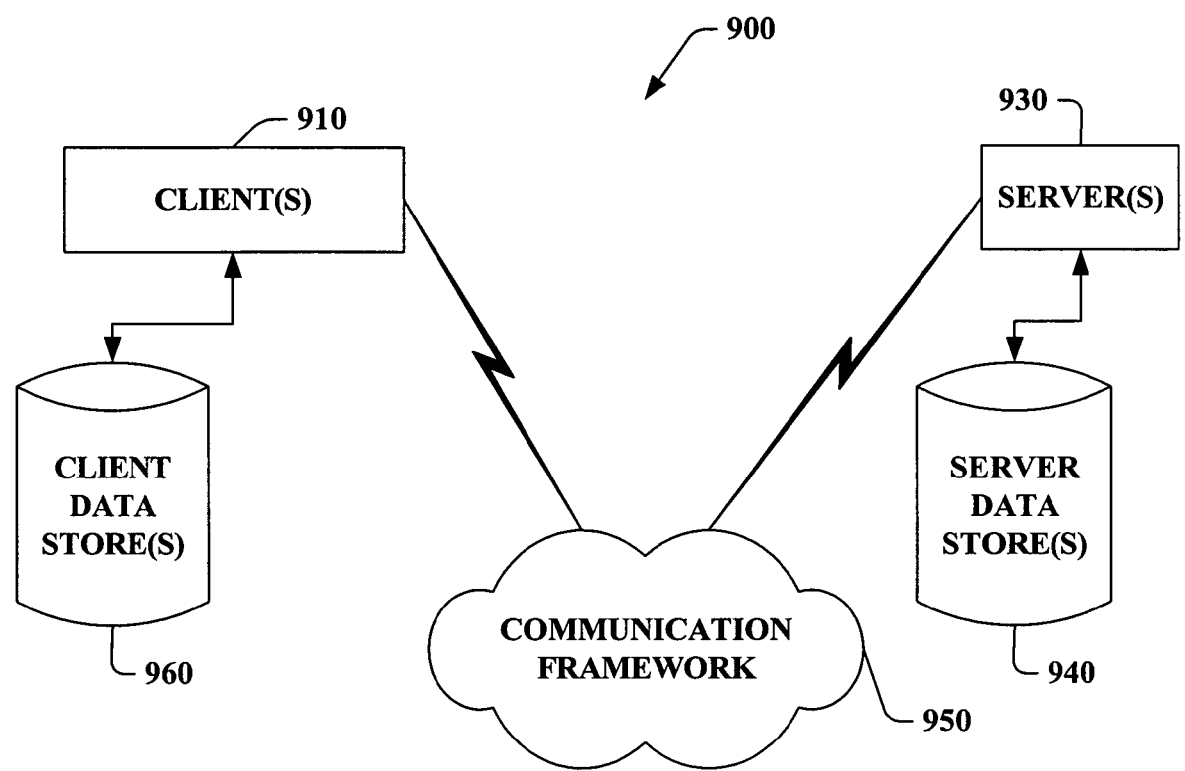
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer comprising a memory and a processor, the memory tangibly embodying the following components executable by the processor to facilitate an automated call routing system:
   - an automated call routing component to direct calls to one of a spoken dialog system or an operator;
   - a decision determining component associated with the automated call routing component that, upon receiving the calls determines, based in part on a decision model, a probability that the calls are likely to fail when serviced by the spoken dialog system;
   - a queuing determining component to determine, based in part on a queuing model, a busyness state of the operator; and
   - a component that integrates the decision model and the queuing model to balance the costs between directing the calls to the operator, based on the determined busyness of the operator, and directing the calls through the spoken dialog system, based on the determined probability that the calls will fail, to determine whether to route the calls to the operator.

2. The system of claim 1, the decision model employs a maximum expected utility (MEU), which states that an action A=a is selected that maximizes an expected utility, EU(a|ξ), wherein ξ denotes background information and a variable H represents possible states of the world.

3. The system of claim 2, the decision model is optimized according to the following equation:

$$\underset{a}{\operatorname{argmax}} \, EU \, (a \mid \xi) = \underset{a}{\operatorname{argmax}} \sum_{h} P(H = h \mid \xi) u(a, h)$$

wherein u (a, h) expresses a utility of taking action a when a state of the world is h.

4. The system of claim 1, the decision model further comprising a variable d to denote an action of dispatching a call, a variable S to denote the plurality of possible outcomes of the automated call routing system, which, corresponds to a variable Failure, a variable O denote a state of one or more operators, which is one of busy or not busy.

5. The system of claim 4, the decision model is adapted to dispatch a call to an operator when an expected utility of d, given a state of the operator O and call routing system S, exceeds that of a dialog action a and described by the following equation:

$$\forall_{a \neq d}[EU(d|S,O) > EU(a|S,O)].$$

6. The system of claim 5, the decision model with respect to a dispatch d, applies a definition of conditional probability to obtain:

$$UE(d) = \sum_S \sum_O P(S, O \mid d)u(d, S, O)EU(d)\Sigma\Sigma$$

where P(O|S, d), is a likely state of a call center queue; P(S), is a likely outcome of a call routing system; and u(d, S, O), is a utility of dispatching a call when the one or more operators may or may not be busy and the automated call routing system may or may not be failing.

7. The system of claim 6, the decision model accounts for effects of other dialog actions taken by the call routing system that remain within the system, and is formulated as:

$$P(O|S, \neg d)P(S) = P(O|\neg d)P(S).$$

8. The system of claim 1, the queuing model employs at least two parameters: λ, an average arrival rate into a call center, and μ, an average service time to complete a call when an operator receives it.

9. The system of claim 8, the average arrival rate and the average service time are modeled according to a Poisson process.

10. The system of claim 8, the queuing model determines operator load via estimated λ and μ a parameters in accordance with an M/M/s queue, which denotes a queue in which an arrival process is "memory-less," a service process "memory-less," and the number of servers is z.

11. The system of claim 10, further comprising a determination of a likelihood that all operators are busy in a call center if a call is dispatched for an M/M/z queue as follows:

$$P(O \mid S, d) = P(n \geq z)$$

$$P(O \mid S, d) = \left(1 - \sum_{n=0}^{z} P_n\right)$$

where n represents a number of callers, and Pn is a closed form solution for multiple servers.

12. The system of claim 1, at least one of the decision model and the queuing model further describes a utility of a dialog action a given an operator state O and system state S as approximately decomposed as follows:

u(a,S,O) u(a,S)+u(a, O).

13. The system of claim 12, if a=d, or dispatch to an operator, then, a cost function is described as:

c(d,SO)≅CustCost·(t+W)+OpCost·z wherein t is a time a caller has spent in an automated system, and W is a "dwell time," which includes a time waiting in line and time being served.

14. The system of claim 13, further comprising a future cost determination of remaining in a system for an estimated amount of time longer than t.

15. The system of claim 14, t is determined via Gaussian models.

16. The system of claim 1, further comprising an average cost savings function described as follows:

$$AverageSavings = \frac{\sum_n |ec(d) - ec(\neg d)|}{n}$$

where cc is an expected cost.

17. The system of claim 1, further comprising a component to at least one of monitor an average rate of dispatch, and adjust an average rate of arrival in the queuing model.

18. The system of claim 1, the models applied to optimize individualized costs and utilities, including user frustration or minimizing a caller's time.

19. A program storage medium readable by a computer having a memory and a processor, the medium tangibly embodying one or more programs of instructions executable by the computer to implement a system that facilitates call routing, comprising:
    means for interacting with a caller through an automated dialog;
    means for automatically directing a call made by the caller to an operator of a plurality of operators based on a conclusion from a decision-theoretic analysis; and
    means for performing the decision theoretic analysis, the decision-theoretic includes an analysis for determining, based on a probability that the call is likely to fail when answered by the interacting means, whether dispatching the call to an operator of the plurality of operators minimizes support costs for an enterprise comprising the plurality of operators.

20. A method for automatic call management, comprising:
    determining a decision-theoretic model for a call routing system that predicts a likely outcome of a call when directed to a spoken dialog system using real-time, extractable features for optimal decision making wherein a variable d denotes an action of dispatching a call to an operator of a plurality of operators, a variable S denotes possible outcomes of the call routing system which corresponds to a variable Failure, a variable O denotes a state of one or more operators, which is one of busy or not busy;
    determining a queuing model to model the call routing system; and
    automatically directing calls to at least one of an organization member or an operator when calls are likely to fail when dealt with by the spoken dialog system such that an expected utility of the action d given a state of the operator O, as predicted based on the queuing model, and call routing system S exceeds that of a dialog action a of the spoken dialog system, as predicted by the decision-theoretic model and described by the following equation:
    $\forall_{a \neq d}[EU(d|S,O) > EU(a|S,O]$, hence mitigating costs for an organization comprising the plurality of operators.

21. The method of claim 20, the decision-theoretic model employs a maximum expected utility (MEU), which states that an action A=a is selected that maximizes an expected utility, EU(a/ξ), wherein ξ denotes background information.

22. The method of claim 21, the decision-theoretic model is optimized according to the following equation:

$$\underset{a}{\operatorname{argmax}} \, EU(a \mid \xi) = \underset{a}{\operatorname{argmax}} \sum_h P(H - h \mid \xi)u(a, h)$$

wherein u(a,h) expresses a utility of taking action a when a state of the world is h.

23. The method of claim 20, the queuing model employs at least two parameters: an average arrival rate into a call center, and an average service time to complete a call when an operator receives it.

24. The method of claim 23, the average arrival rate and the average service time are modeled according to a Poisson process.

25. The method of claim 24, the queuing model determines operator load via estimated parameters in accordance with an M/M/s queue, which denotes a queue in which an arrival process and a service process are memoryless.

26. A program storage medium readable by a computer having a memory and a processor, the medium tangibly embodying one or more programs of instructions executable by the computer to facilitate an automated call routing system, comprising:

an automated call routing component to direct calls to one of a spoken dialog system or a live operator of a plurality of live operators;

a decision determining component associated with the automated call routing component to determine, based in part on a decision model:

when the calls are likely to fail when dealt with by the spoken dialog system, and based on a balance of costs between directing the calls to the live operator and directing the calls through the spoken dialog system, whether the calls should be transferred to the live operator such that an expected utility of an action d, given a state of the live operator O and call routing system S, exceeds an expected utility of a dialog action a of the spoken dialog system and described by the following equation: $\forall_{a \neq d}[EU(d|S,O) > EU(a|S,O)]$, wherein d denotes an action of dispatching a call to the live operator, S denotes possible outcomes of the call routing system, which, corresponds to a variable Failure, the variable O denotes a state of the plurality of live operators, which is one of busy or not busy; and a queuing determining component to determine, based in part on a queuing model, a busyness state of the live operator, the decision model is integrated with the queuing model balance the costs between directing the calls to the live operator and directing the calls through the spoken dialog system, the decision model and the queuing model optimize individualized costs and utilities, including user frustration or minimizing a caller's time.

* * * * *